United States Patent [19]

Holmes et al.

[11] Patent Number: 6,134,642
[45] Date of Patent: Oct. 17, 2000

[54] DIRECT MEMORY ACCESS (DMA) DATA TRANSFER REQUIRING NO PROCESSOR DMA SUPPORT

[75] Inventors: Anthony John Holmes, Nr. Reading; Mark Elliott, Berkshire; Ian Nicholas Cottam, Basingstoke, all of United Kingdom; John Harper, Golfe Juan, France; Martin Stratford, Herefordshire, United Kingdom

[73] Assignee: Digital Esquipment Corporation, Houston, Tex.

[21] Appl. No.: 08/698,191

[22] Filed: Aug. 15, 1996

Related U.S. Application Data

[63] Continuation of application No. 08/129,706, Sep. 30, 1993, abandoned.

[30] Foreign Application Priority Data

Oct. 1, 1992 [GB] United Kingdom .................... 9220704

[51] Int. Cl.⁷ ...................................................... G06F 13/14
[52] U.S. Cl. .......................... 711/213; 711/137; 711/204; 710/22; 710/129
[58] Field of Search ..................................... 395/250, 841, 395/842, 495; 709/212; 710/22, 24, 26, 28, 27, 48, 112, 129, 130, 260; 711/137, 204, 213

[56] References Cited

U.S. PATENT DOCUMENTS 4,484,262  11/1984  Sullivan et al. ......................... 395/425
4,755,936   7/1988  Stewart et al. .......................... 395/425
4,855,900   8/1989  Simpson et al. ........................ 395/425
4,975,832  12/1990  Saito et al. .............................. 395/425
4,989,135   1/1991  Miki ........................................ 395/325
5,007,012   4/1991  Dujari .................................... 395/425
5,063,498  11/1991  Hirahara et al. ........................ 395/425
5,367,695  11/1994  Narad et al. ............................. 709/210
5,410,654   4/1995  Foster et al. ............................ 395/275
5,414,820   5/1995  McFarland et al. .................... 710/128
5,459,839  10/1995  Swarts et al. ........................... 710/112

*Primary Examiner*—John W. Cabeca
*Assistant Examiner*—Denise Tran
*Attorney, Agent, or Firm*—Cesari and McKenna

[57] ABSTRACT

A digital system has a main memory 10 with a main memory access (DMA) unit 11 through which data channels 12, 13 are coupled to the memory. A processor system (processor 14, RAM data memory 15, instruction memory 16) is also coupled to the memory through a read/write buffer 20, each read stalling the processor for typically 5 cycles. For block reads, a block memory read unit 25 is connected in parallel with the path between the read/write buffer 20 and the DMA unit 11. This block read unit can be set from the processor 14 with a block start address and a block length passed as writes through the read/write buffer 20. The block is read (first phase) word by word from the main memory via the DMA unit into a memory 28 in the block read unit. The processor then sends a command to the block read unit as a read through the read/write buffer, which then writes the block word by word directly into the memory 15 (second phase), using the processor's local data and address buses 17 and 18 and disabling the processor's address buffer 32.

6 Claims, 1 Drawing Sheet

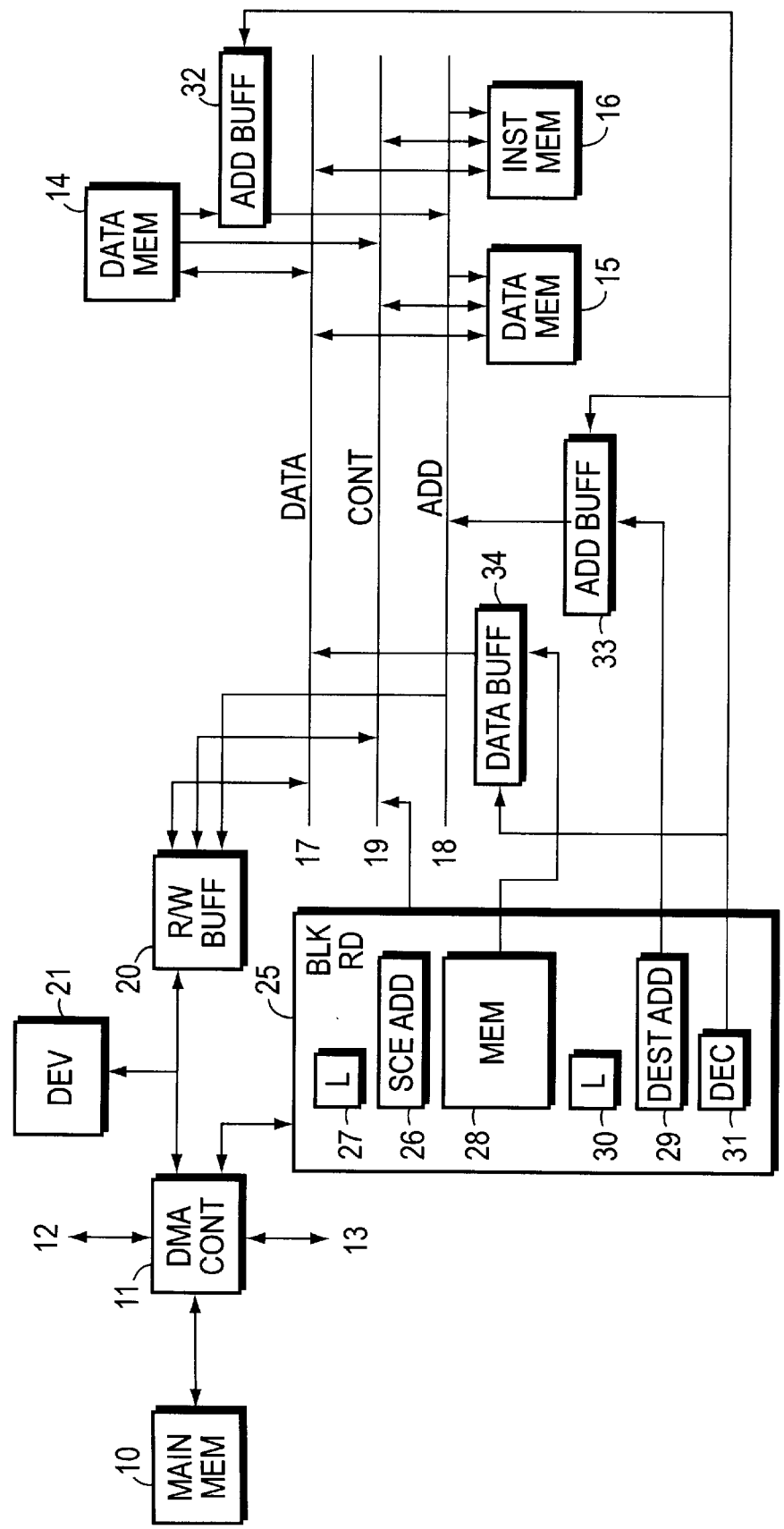

DIRECT MEMORY ACCESS (DMA) DATA TRANSFER REQUIRING NO PROCESSOR DMA SUPPORT

This application is a continuation, of application Ser. No. 08/129,706, filed Sep. 30, 1993 now abandoned.

FIELD OF THE INVENTION

The present invention relates to the coupling of a processor to a memory.

BACKGROUND OF THE INVENTION

In many computing and other digital systems, it is necessary to deal with various flows of information and to perform various different processing operations. Dealing with the information flows may require various memories of different speeds and sizes, and performing the processing operations may require one or more processors. The various information paths, memories, and processors need to be coupled together efficiently.

A particular instance of this is in message switching and communication systems where the volume of information passing through a switching node is high. (It will of course be realized that although the invention finds particular application to message switching and communication systems, it is applicable to other systems where similar problems arise.)

The primary design requirement in such systems is to achieve efficient handling of the messages, which involves optimizing the message memory and the information flow paths involving that memory. In addition to the primary functions of receiving, storing, and retransmitting messages, a variety of other functions must also be performed, and a processor is needed to perform these functions. This processor will usually have its own private memory system, for storing its programs and associated data. This processor must, however, be coupled to the rest of the system, so that it can (among other things) read from and write to the main message memory.

The main memory will have its own memory access unit, which will be concerned primarily with achieving efficient message data flow through the main memory. It is convenient to couple the processor to the main memory access unit through a read/write buffer. This enables the main memory controller to interleave access requests from the processor with message information flows, and allows the main memory controller to operate largely independently of the processor, which will normally perform its processing independently of the message flows involving the main memory.

The processor will therefore communicate with the main memory by passing access requests to the buffer. If the access request is a write, then the processor can continue with its processing immediately; the word to be written to main memory will be stored in the buffer and can be ignored by the processor. If the access request is a read, then the processor normally waits until the required word is read from the main memory by the buffer; this involves a wait of typically some 5 to 10 cycles of the processor.

In principle, the processor could be programmed so that on a read, it continues with further operations, not requiring the word being read from the main memory, for a substantial number of cycles, and only then check the buffer for the required word from the main memory. This would reduce the chance of having to wait at all, and even if a wait is required, the wait will generally be short. However, this would normally involve considerable complications in the program, and would also involve at least one cycle for the processor to check the buffer. This technique is therefore not normally employed. Indeed, the architecture of some common processors does not permit this technique: they stall unconditionally on a read.

In many situations, the use of a read/write buffer in this way provides an adequate solution to the problems of coupling the processor to the main memory. The main memory access unit can deal with memory accesses from the processor in such a manner that it does not adversely affect the (more important) message information flows, while the processor can run at close to full speed. The processor loses no cycles for writing to main memory, and although it loses cycles when words have to be read from the main memory, the reads will normally be a small proportion of the processing load and the lost cycles will have only a small impact on the overall speed.

If the information flow rate between the processor and the main memory has to be high, however, there can still be problems.

If a considerable amount of information has to be written from the processor to the main memory, this can usually be achieved without undue difficulty. The buffer can have a capacity of several words, so a block of that number of words can be written into the buffer in whatever manner and rate is most convenient for the processor. If a larger number of words is to be written, then they can usually be stored in the processor's local memory and then transferred block by block to the buffer; this will impose a certain time penalty on the processor, but that penalty will usually be small compared with the processing time required to generate the words in the first place.

If a considerable amount of information has to be read from the main memory to the processor memory, however, the problem can be more severe. For each read call by the processor to the buffer, there is a delay of some 5 to 10 cycles for the desired word to appear in the buffer. While, as discussed above, the processor could be programmed to occupy part of this time by other processing, complicated and careful programming is required, and the processor will use most of the extra processing in repeated switching between generating the successive read calls (and storing their results in the local memory) and whatever other processing task is assigned to it in the intervals between read calls.

The main object of the present invention is to alleviate this problem.

One possible way of tackling the problem is to couple the processor directly to the memory access unit (which normally operates in a direct memory access (DMA) mode). However, this has the disadvantages that the processor is stalled during access to the main memory, and also that the memory access will still normally be subject to delays because the accesses from the processor still have to be interleaved with other memory accesses (for message flows).

Another possible way of tackling the problem is by using a cache system. This also has serious problems. The cache has to be associated with the main memory (the problem is obviously not solved by a cache on the processor side of the buffer, if there is a buffer). For the cache to improve the access speed of the processor to a block of words, transfers between the cache and the main memory should be of a size comparable with the block size. But since the main usage of the main memory is in connection with the message information flows, the main effect of the cache will be on those flows, and this can adversely affect the overall performance.

SUMMARY OF THE INVENTION

Accordingly the present invention provides a digital system having: a main memory with a main memory access (DMA) unit through which data channels are coupled to the memory, and a local processor system coupled to the main memory through a read/write buffer, the local processor system including a processor and a random access (RAM) memory coupled together by means of local data and address buses, characterized by a block memory read unit connected in parallel with the path between the read/write buffer and the DMA unit and coupled to the local data and address buses, the block memory read unit being settable from the processor with a block start address and a block length passed as writes through the read/write buffer and thereupon reading the block (first phase) from the main memory via the DMA unit into a memory in the block read unit, and being responsive to a command sent by the processor through the read/write buffer to write the block directly into the RAM memory (second phase).

BRIEF DESCRIPTION OF THE DRAWINGS(S)

The novel features believed characteristic of the invention are set forth in the appended claims. The invention itself, however, as well as features and advantages thereof, will be best understood by reference to the detailed description of specific embodiments, which follow, when read in conjunction with accompanying drawings, wherein:

FIG. 1 is a block diagram of a system according to the principles of the present invention.

DETAILED DESCRIPTION

Briefly, the preferred arrangement provides a block memory read unit, connected in parallel with the path between the read/write buffer and the main memory access unit which can be set from the processor with a block start address and a block length passed as writes through the read/write buffer, and thereupon reads the block from the main memory via the memory access unit (first phase), and which is coupled to the processor's local address and memory buses to write the block directly into the processor's local memory (second phase). Preferably the second phase is initiated by the processor sending a command to the block memory read unit as a read through the read/write buffer.

A message switching and communication system embodying the invention will now be described, by way of example, with reference to the drawing, which is a block diagram of the system.

Referring to the FIG. 1, there is a main memory 10 connected to a DMA main memory access (control) unit 11 which is coupled to message data units (not shown) over links 12 and 13. There is also a processor 14, which has its own data memory 15 and instruction memory 16, to which it is coupled by a data bus 17, an address bus 18, and a control bus 19. This processor performs various supervisory and background processing tasks relating to the system. The system also includes various other components, of which one, a ROM 21, is shown merely by way of example.

For the processor 14 to perform some of its tasks, it requires access to the main memory 10 as well as to its local memory 15. This is achieved by means of a read/write buffer 20, which is coupled on one side to the buses of the processor 14 and on the other side to the memory access unit 11. The read/write buffer 20 operates to permit the processor 14 to access the memory 10, for both reads and writes.

For a write, the processor sends to the read/write buffer the address of the word to be written (on the address bus 18), together with the word itself (on the data bus 17). The read/write buffer then sends a write request signal to the memory access unit 11. Once the processor has written the word in the read/write buffer, it can proceed immediately with its subsequent operations. In due course, the memory access unit accepts the write request from the read/write buffer and writes the desired word in the memory 10 at the desired address.

The read/write buffer 20 can in fact store several words for writing to main memory, operating as a FIFO (first in first out) memory. The fact that the words in it may suffer some delay in actually being written into main memory does not affect the operation of the processor.

For a read, the processor sends the address of the desired word to the read/write buffer, which then sends a read request signal to the memory access unit 11. The memory access unit deals with this read request along with memory access requests from the variety of other sources (the channels 12 and 13). In due course, the memory access unit reads the desired word from the memory 10 and writes it into the read/write buffer. The processor can then read the word from the read/write buffer, and either process it or write it to its local data memory 15.

The read/write buffer can store a read as well as the writes; as the read/write buffer is designed to work with a processor which waits for the result of a read, there is no need for it to be able to store more than one read at a time. The read/write buffer gives priority to the read (if any) over any writes, to minimize processor delays. To ensure that the read is of the current value of the word to be read, it also contains address matching circuitry which matches the address of the read with those of any pending writes; if there is a match, the write with that address is performed immediately and the read then performed. (This ensures that the correct value is returned if the write is to a register which returns a different value.)

More specifically, for reading the processor sends to the read/write buffer a read request signal on the control bus along with the address on the address bus. When the desired word has been passed by the main memory access unit to the read/write buffer, the read/write buffer changes the state of a control signal to the processor. In due course, the processor responds to the control signal from the read/write buffer to cause it to put the word onto the data bus.

The read/write buffer normally tristates its connection to the data bus; that is, it sets those connections free to float. It can therefore receive information from the data bus, but does not interfere with any other operations which are occurring on that bus. It only drives the data bus when requested to do so by the processor, to put a word on the data bus as the final stage of a read request.

The system as described so far is conventional. The present system also includes a block read unit 25, for performing block main memory reads, which is coupled to the read/write buffer 20, the main memory access unit 11, and certain further components associated with the processor 14 as described below. The block read operation occurs in two phases.

The block read unit 25 includes a source address register 26 for storing the address in the main memory 10 of the block to be read, a block length register 27 for storing the length of the block, and a multi-word block memory 28 for storing the block. The block read unit 25 also contains a destination address register 29 and a second block length register 30, discussed below. These registers are assigned addresses which are of the same format as the addresses of the main memory 10 but are outside the memory space of that memory; registers 27 and 30 share the same address and are therefore written to together. As will be seen, the block read unit 25 also recognizes to a fourth similar address, responding to it in a manner discussed below, In practice, it may be convenient to use a holding register and merge the registers 27 and 30 into a single counter which is reloaded from the holding register. It may also be convenient to merge the registers 27 and 30 with the registers 26 and 29.

For the first phase of a block read, the source address (ie. the address in main memory 10) of the first word of the block and the length of the block are sent by the processor 14 to the read/write buffer 20 as data words on the data bus 17, accompanied by the addresses of the registers 26 and 27 as the addresses of these two writes on the address bus 18. These two writes pass through the read/write buffer as normal writes in the usual way, and eventually appear at its output on the main memory side. The block read unit 25 receives them and, since their addresses are those of the registers 26 and 27, loads their two data words into those two registers. The main memory access controller 11 ignores them, as their addresses are outside the address range of the main memory 10.

The processor 14 can proceed with further processing once it has sent these two writes. However, the destination address (ie. the address in the local memory 15) of the first word of the block also has to be sent to the block read unit 25, and it may be convenient for the processor to send this at the same time, ie. to send a group of three writes together. The destination address is of course sent as a data word on the data bus 17, accompanied by the address of the destination address register 29 in the block read unit 25.

When the block read unit is active, ie. loaded with a source address and a block length, it sends a read request to the main memory access unit 11 for access to the main memory 10. The unit 11 responds to this request in the usual way. In due course the first word of the block is therefore read from main memory and passed to the block read unit 25, where it is stored in the block memory 28. The registers 26 and 27 are constructed as counters; the source address register 26 counts up through successive addresses of the block as the block length counter 27 counts down to zero, so that the words of the block are read from the main memory 10 one by one into the block memory 28, the main memory access unit 11 dealing with them together with access requests from the other sources (12, 13, 20, etc).

The first phase ends when the required block has been copied into the block read unit 25. On this, that unit sends a control signal (similar to the signal sent by the read/write buffer 20 for a normal read) to the processor 14. The processor suspends whatever other processing it has been proceeding with, and sends a read to the fourth special address of the block read unit 25, through the read/write buffer 20, initiating the second phase of the block read. In due course, this read passes through the read/write buffer and is recognized by the block read unit 25, energizing a decoder 31 therein.

The second phase can be initiated by an interrupt signal sent to the processor. Preferably, however, the block read unit sets a flag in a status register (not shown), which the processor can inspect when convenient. This technique is more flexible than using an interrupt, and avoids the delays (context saving) involved in interrupts.

The destination address register 29 in the block read unit 25 is coupled to the address bus 18, and the block memory 28 is similarly coupled to the data bus 17. The registers 29 and 30 are, like the registers 26 and 27, constructed as counters. When the decoder 31 is energized, the destination address register 29 counts up through successive addresses of the block as the block length counter 30 counts down to zero, and the words of the block are copied (written) one by one into the local memory 15 from the block memory 28.

This block transfer was, as noted above, initiated by the processor sending a read (rather than a write) to the special address to the read/write buffer 20. The block read unit 25 returns a dummy word to the read/write buffer, as well as performing the block transfer just described. The read/write buffer 20 will therefore send a control signal to the processor 14. During the block transfer from the block read unit 25 to the local memory 15, the processor is stalled. Once the data transfer is completed, the block read unit 25 sends a control signal to the processor at the end of the block read, so that the processor can resume processing. The processor can then acknowledge the control signal from the read/write buffer 20, but simply ignores the dummy word which the read/write buffer then makes available.

The processor 14 is coupled to the address bus 18 via an address buffer 32 rather than directly. The destination address register 29 in the block read unit 25 is also coupled to the address bus 18 through a similar address buffer 33. Normally, buffer 32 is enabled and buffer 33 is disabled, but when the decoder 31 is energized, it disables buffer 32 and enables buffer 33. The block memory 28 is similarly coupled through a data buffer 34 to the data bus 17, and this buffer is similarly normally disabled but is enabled by the decoder 31. The read/write buffer 20 tristates its output to the data bus 17 until it receives an acknowledgement from the processor, so it does not interfere with the block transfer even though there is no buffer between it and the data bus 17.

The block read will take a considerable time—some 5 to 10 cycles per word—because the reading of each word is performed by the memory access unit 11 in substantially the same way as reading via the read/write buffer 20. However, once the block read has been initiated by the processor 14, it proceeds without further intervention of the processor. The processor can therefore proceed with some other processing task for some considerable time, and need only check the status of the block read at times and intervals convenient to the other tasks performed by the processor.

Once the block is ready for the second stage of transfer, it will be copied into the local memory 15 at a rate limited only by the operating characteristics of the processor portion of the system. The processor itself is only stalled for the time taken to copy the complete block from the block read unit to the processor's local memory, ie. 1 cycle per word of the block.

What is claimed is:

1. A method for Direct Memory Access data transfer comprising the steps of:

issuing a command by a processor to a block memory read unit requesting the block memory read unit transfer a data block stored in a source memory to a destination memory;

transferring the data block by the block memory read unit from the source memory to an intermediate memory;

informing the processor by the block memory read unit after the block memory read unit has completed the data block transfer to the intermediate memory;

issuing a read command for the data block by the processor to the block memory read unit;

delaying a response to the read command by the block memory unit;

transferring the data block by the block memory read unit from the intermediate memory to the destination memory; and sending the response to the read command.

2. A method for Direct Memory Access data transfer according to claim 1 wherein the step of informing a processor is performed by sending an interrupt request to the processor.

3. A method for Direct Memory Access data transfer according to claim 1 wherein the step of informing a processor is performed by setting a flag in a register.

4. Apparatus for Direct Memory Access data transfer comprising:

a source memory, such source memory storing a data block;

a destination memory;

a block memory read unit coupled to both the source memory and the destination memory;

a processor coupled to the block memory read unit and the destination memory;

the block memory unit comprising:

an intermediate memory; and control logic circuitry for transferring the data block from the source memory to the intermediate memory upon receiving a command from the processor requesting such transfer, and for informing the processor when the block memory read unit has completed transferring the data block from the source memory to the intermediate memory, and control logic circuitry further delaying a response to a read command, for the data block from the processor until the block memory read unit has transferred the data block from the intermediate memory to the destination memory.

5. Apparatus for Direct Memory Access data transfer according to claim 4 wherein the control logic informs the processor through an interrupt request to the processor.

6. Apparatus for Direct Memory Access data transfer according to claim 4 wherein the control logic informs the processor by setting a bit in a register.

* * * * *